Patented Nov. 21, 1950

2,531,029

UNITED STATES PATENT OFFICE 2,531,029

METHOD OF TREATING VINEGAR

Rolland F. Cohee, Jr., Wheaton, Ill., assignor to Corn Products Refining Company, New York, N. Y., a corporation of New Jersey No Drawing. Application February 8, 1950, Serial No. 143,160

16 Claims. (Cl. 99—147)

This invention relates to the removal of metallic ions from vinegar. More particularly, it relates to the removal of traces of metallic ions such as iron, copper and lead from vinegar.

The presence of trace metals, such as iron and copper and the like, in vinegar is objectionable because they cause a haze in the vinegar, are responsible for discoloration and on standing may precipitate or settle out. Several methods have been proposed for the removal of traces of metallic ions from vinegar. Clarification with gelatin and tannin has not been successful. Treatment with activated carbon removes only part of the iron but at the same time removes the color from ciger vinegar. The use of ion exchange resins has also been proposed but this is complicated and expensive.

It is an object of the present invention to provide a new and improved method of removing trace metals and their effects from vinegar. A further object is to provide a method for the removal of trace metals from vinegar which is simple and economical. Still a further object is to remove from cider vinegar the objectionable color due to trace metals without removing the natural color of the vinegar. Other objects will appear hereinafter.

I have discovered that trace metals present in vinegar in the form of metal salts may be removed therefrom by treating the vinegar with small amounts of phytate salts. Among the phytate salts suitable for this purpose are sodium phytate, potassium phytate, ammonium phytate, calcium phytate, magnesium phytate, and the mixed salts of phytic acid, such as calcium-magnesium phytate, or mixtures thereof. Phytic acid is also suitable for carrying out the invention. Mixed salts of phytic acid may be obtained by precipitation from acidic plant extracts, as, for example, corn steep liquor, with an alkaline substance such as, for example, calcium hydroxide, lime or magnesium hydroxide. When corn steep liquor or similar acidic extracts of plant materials are neutralized with calcium hydroxide, or lime, or magnesium hydroxide, the precipitates that form are crude salts of phytic acid, comprising essentially calcium phytate, or magnesium phytate, or mixtures thereof. If calcium hydroxide, or lime, is used as the precipitant, the precipitate consists mainly of calcium phytate but since plant extracts always contain some magnesium, some of this will be retained in the precipitate. Such precipitate will usually contain five calcium atoms to one magnesium atom. If magnesium hydroxide is used as a precipitant, the precipitate consists almost entirely of magnesium phytate but a small amount of calcium may be contained therein. These precipitates should be purified of proteinaceous materials contained in the steep liquor. The term "mixed calcium-magnesium phytate", as used hereinafter, is intended to include all mixed calcium-magnesium salts of phytic acid regardless of which metal predominates.

The amount of phytate salt or phytic acid which may be used, in accordance with the present invention, may vary rather widely. If complete removal of trace metals is desired, the amount to be added should be sufficient to react with all the metal salts present in the vinegar to form insoluble phytate complexes. Amounts in excess of this are not ordinarily detrimental nor are they necessary, except as hereinafter specified. Ordinarily, 0.1 to 1.0 g. of each substance specified per liter of vinegar is sufficient. The insoluble phytate complex may be removed from the vinegar easily as by filtration.

The phytate salt or phytic acid to be added to the vinegar may be added in aqueous solution or directly, the specified materials to be added all being somewhat soluble in vinegar.

After the phytate salt or phytic acid is added, the vinegar may be heated to about 160° F., or preferably to about 180° F., or higher (particularly when calcium or mixed calcium-magnesium phytate is used) to effect precipitation or insolubilization of the phytate complex and to facilitate flocculation thereof.

The precipitates will flocculate at room temperature but the amount of time required is considerably longer than when the vinegar has been heated. Generally, a period of 21 days, at room temperature, is sufficient.

Heating also serves an additional purpose when calcium phytate or mixed calcium-magnesium phytate is used as the additive. These phytates are soluble in vinegar (5 g./liter of 5 percent acetic acid or 50 grain cider vinegar) at low temperatures but above about 160° F., a haze forms, and at higher temperatures, including the boiling temperature, both salts separate out as flocculant precipitates. Substantially all of the excess of calcium or mixed calcium-magnesium phytate present in the vinegar, if an excess has been added, may be removed by heating and filtering the vinegar at temperatures above 160° F. The precipitated insoluble phytate complexes with the iron, lead, copper, etc. are flocculated by the heat treatment and may be removed also at such temperatures. If the vinegar has been treated with calcium or mixed calcium-magnesium phytate in this manner, and then cooled, and it is later desired to pasteurize it, temperatures above that at which it was filtered should be avoided as additional calcium or mixed calcium-magnesium phytate may precipitate out. If the treatment with either of these phytates (where an excess has been used) has been carried out at lower temperatures, and it is desired to pasteurize the vinegar, temperatures above about 160° F. should preferably be avoided to prevent dissolved phytates from precipitating out. While pure calcium phytate will be redissolved when the vinegar is cooled, commercial or technical grades will not redissolve completely.

More efficient removal of metals is effected by adding the phytate or phytic acid in two or more doses, the total amount being slightly more than the theoretical, carrying out heat treatment or allowing a period for the formation and flocculation of the insoluble precipitate and preferably removing such precipitate, after the addition of each dose. If heat treatment is used, the vinegar should be cooled and filtered before another dose is added.

It has been found that the addition of calcium phytate or mixed calcium-magnesium phytate to cider vinegar has a tendency to reduce the amount of natural color, particularly when an excess of either of these phytates is added. Apparently, the insoluble flocculant phytate precipitate adsorbs some of the natural coloring matter in the vinegar, i. e., tannin. This tendency may be decreased by adding only the theoretical amount of phytate to react with the metals present. Color may be redeveloped by heating but temperatures above 160° F. should preferably be avoided for the reasons heretofore indicated.

By way of illustrating my invention, the following specific examples are provided; however, it is to be understood that these examples are illustrative only and are not intended as limiting the invention to these or any other particular examples.

EXAMPLE I

A mixed calcium-magnesium phytate obtained by precipitation with lime from corn steep liquor and purified of proteinaceous impurities was added to cider vinegar at the rate of 1.25 lbs. per 1000 gals. of vinegar. The vinegar was then allowed to stand at room temperature for several weeks. Samples were withdrawn after five and 14 days, filtered, and analyzed for iron content. Table I shows the percentage of removal of iron at different time intervals.

Table I

|  | Sample Number | | |
|---|---|---|---|
|  | A | B | C |
| Iron before treatment...............p. p. m.. | 25 | 25 | 25 |
| 5 Days after treatment...............p. p. m.. | 12 | 7 | 12 |
| Percent iron removed.............................. | 52 | 72 | 52 |
| 14 Days after treatment.............p. p. m.. | 3 | 4 | 3 |
| Percent iron removed.............................. | 88 | 84 | 88 |
| 33 Days after treatment.............p. p. m.. | 2.5 | 2.5 | 2.5 |
| Percent iron removed.............................. | 90 | 90 | 90 |

EXAMPLE II

A mixed calcium-magnesium phytate, as specified in Example I, was added to two types of vinegar at the rate shown in Table II. The vinegars were heated to 180° F. and then allowed to cool to room temperature and to stand for various times. The filtrates were analyzed for iron and copper contents. The filtrates after standing several days, were filtered again and the new filtrates analyzed for iron and copper contents.

EXAMPLE III

A badly contaminated white distilled vinegar was treated with successive portions of mixed calcium-magnesium phytate (obtained from steepwater, as in Example I) at the rate of 0.1 g. of phytate per 100 cc. of vinegar. The treated vinegar was heated to 180° F. after each dose and filtered after standing for 15 minutes. The vinegar was analyzed before and after treatment for iron and copper contents.

Table II

|  | White Distilled Vinegar | Date | Cider Vinegar | | | | | | | |
|---|---|---|---|---|---|---|---|---|---|---|
|  |  |  | Sample 1 | Date | Sample 2 | Date | Sample 3 | Date | Sample 4 | Date |
| Gr. Ca-Mg phytate added per pint (450 cc.)........... | 0.01 | ...... | 0.02 | ...... | 0.10 | ...... | 0.06 | ...... | 0.7 | ...... |
| Iron before treatment, p. p. m.. | 4 | 5/25 | 9 | 8/25 | 40 | 8/10 | 30 | 8/25 | 25 | 7/23 |
| Iron after treatment, p. p. m.... | 2.5 | 8/26 | 4 | 8/28 | 5 | 8/17 | 12.5 | 8/26 | 2.5 | 8/23 |
| Iron after treatment, p. p. m.... |  |  |  |  |  |  | 7 | 8/28 |  |  |
|  |  |  |  |  |  |  | 6 | 9/3 |  |  |
| Copper before treatment, p. p. m................. | 1.5 | 8/25 | 10 | 8/25 | ...... | ...... | 35 | 8/25 | 35 | 7/23 |
| Copper after treatment, p. p. m................. | 1.25 | 8/26 | 4 | 8/28 | ...... | ...... | 25 | 8/26 | 5 | 8/25 |
| Copper after treatment, p. p. m................. |  |  |  |  |  |  | 20 | 8/28 |  |  |
|  |  |  |  |  |  |  | 2 | 9/3 |  |  |

Table III

| Treatment | Date | Visual | White Vinegar | |
|---|---|---|---|---|
|  |  |  | Fe | Cu |
|  |  |  | p. p. m. | p. p. m. |
| None, start............. | 8/26/49 | ............ | 40 | 60 |
| 0.1 g. Ca phytate/100 cc. heat; let stand 15 min. filtered. | 8/26/49 | Heavy ppt. | 12 | 30 |
| 2nd 0.1 g. Ca phytate/100 cc. heat; let stand 15 min. filtered. | 8/26/49 | ...do...... | 3 | 25 |
| 3rd 0.1 g. Ca phytate/100 cc. heat; let stand till 8/28/49. | 8/28/49 | Ppt........ | 1 | 20 |

It will be noted from Table III that iron is more readily removed than copper. This is no doubt due to the fact that copper phytate is more soluble in vinegar than iron phytate.

EXAMPLE IV

Vinegar was treated with several amounts of both sodium phytate and mixed calcium-magnesium phytate. After the addition of the sodium, or mixed calcium-magnesium phytate, the samples were heated to 180° F., allowed to cool and permit the precipitates to flocculate and settle. The precipitates were collected by filtration and analyzed for iron and copper contents. After the filtrate had stood for a week, it was again subjected to the above procedure. The analysis of ashed residues indicates that the iron and copper were being removed in the precipitates. The results of the test are shown in Table IV. This example also shows that an excess of phytate material is not necessary to remove trace metals from vinegar.

Table IV

| Treatment | Date | Control | Amount of Phytates Added to 450 cc. Vinegar, Grams | | | | | |
|---|---|---|---|---|---|---|---|---|
| | | | Calcium Phytate | | | Sodium Phytate | | |
| Heat to 180° F. after grams added | 7/23/49 | 0.0 | 0.0625 | 0.125 | 0.194 | 0.0625 | 0.125 | 0.194 |
| Grams of 1st precipitate | 7/23/49 | | 0.0435 | 0.0684 | 0.0773 | 0.0403 | 0.0642 | 0.0612 |
| Grams of 2nd precipitate | 7/30/49 | | 0.0363 | 0.0248 | 0.0356 | 0.0391 | 0.0317 | 0.0343 |
| Grams of combined precipitates | | | 0.0798 | 0.0932 | 0.1129 | 0.0794 | 0.0959 | 0.0955 |
| Iron after treatment, p. p. m. | 8/24/49 | Untreated 25 | 2.5 | 2.5 | 2.5 | 2.5 | 2.5 | 2.5 |
| Copper after treatment, p. p. m. | 8/28/49 | Untreated 35 | 3.5 | 3.5 | 3.5 | 3.5 | 3.5 | 3.5 |

EXAMPLE V

This example shows the effect of adding mixed calcium-magnesium phytate to five percent acetic acid solutions containing small amounts of lead and copper. 0.06 gram of mixed calcium-magnesium phytate (from steepwater) was added to 100 cc. of five percent acetic acid solutions containing small amounts of lead and copper, as set forth in Table V. The solutions were allowed to stand at room temperature 69 days. The results are given in Table V.

Table V

| Date | Blank | Pb | | |
|---|---|---|---|---|
| | | 100 p. p. m. | 50 p. p. m. | 10 p. p. m. |
| 6/18/49 | Clear | ppt | ppt | Clear |
| 8/24/49 | do | ppt | ppt | ppt. |

| Date | Blank | Cu | | |
|---|---|---|---|---|
| | | 20 p. p. m. | 10 p. p. m. | 5 p. p. m. |
| 6/18/49 | Clear | Clear | Clear | Clear |
| 8/24/49 | do | ppt | ppt | Do. |

| Date | Blank | 100 p. p. m. Pb, 10 p. p. m. Cu | 10 p. p. m. Pb, 5 p. p. m. Cu |
|---|---|---|---|
| 6/18/49 | Clear | ppt | Clear. |
| 8/24/49 | do | ppt | ppt. |

I claim:

1. The method of improving vinegar with respect to color and stability which comprises adding thereto a material selected from the group consisting of phytic acid and phytate salts soluble in vinegar, and thereafter filtering said treated vinegar to remove insoluble phytate complexes.

2. The process of treating vinegar which comprises adding thereto a sufficient amount of phytate material to react with the metal salts present therein, heating the vinegar above about 160° F. to facilitate formation of insoluble phytate complexes and separating the insoluble complexes from the vinegar, said phytate material added being selected from the group consisting of phytic acid and phytate salts soluble in vinegar.

3. The process of removing trace metals from vinegar which comprises adding thereto phytate material, allowing said phytate material to react with the metals present in the vinegar, to form insoluble phytate complexes and removing said complexes from the vinegar; said phytate material added being selected from the group consisting of phytic acid and phytate salts soluble in vinegar.

4. The process of treating vinegar which comprises adding thereto mixed calcium-magnesium phytate at the rate of 0.1 to 1.0 g. per liter of vinegar for 25 parts p. p. m. each of iron and 35 p. p. m. of copper content, heating the vinegar to at least 160° F., and thereafter separating the resultant insoluble precipitate from the vinegar while the temperature of the vinegar is at least 160° F.

5. The process of treating vinegar which comprises adding incrementally thereto mixed calcium-magnesium phytate at the rate of 0.1 to 1.0 g. per liter of vinegar for 25 p. p. m. each of iron and 35 p. p. m. of copper content, heating the vinegar to at least 160° F. after each addition, and thereafter separating the resultant insoluble precipitate from the vinegar while the temperature of the vinegar is at least 160° F.

6. In the process of treating vinegar with a phytate material selected from the group consisting of phytic acid and phytate salts soluble in vinegar, the improvement which comprises adding said phytate material incrementally, allowing insoluble phytate complex to form and removing same after each addition of said phytate material.

7. The process of treating vinegar which comprises adding thereto sodium phytate in amount to react with the metal salts present therein to form insoluble phytate and removing said insoluble phytates from the vinegar.

8. The process of treating vinegar which comprises adding thereto a sufficient amount of a phytate material to react with the metal salts present therein, heating the vinegar to about 180° F. and separating the resultant insoluble complex from the vinegar, said phytate material added being selected from the group consisting of phytic acid, and phytate salts soluble in vinegar.

9. The process of treating vinegar which comprises adding thereto mixed calcium-magnesium phytate at the rate of 0.1 to 1.0 g. per liter of vinegar, heating the vinegar to about 180° F., and thereafter separating the resultant insoluble precipitate.

10. The process of treating vinegar which comprises adding incrementally thereto mixed calcium-magnesium phytate at the rate of 0.1 to 1.0 g. per liter of vinegar, heating the vinegar to at least 180° F., after each addition, and separating the resultant insoluble precipitate from the vinegar.

11. The process of treating vinegar which comprises adding thereto a material selected from the group consisting of phytic acid and phytate salts soluble in vinegar, thereafter heating the vinegar to at least about 180° F., cooling the vinegar to room temperature, and thereafter filtering the vinegar to remove insoluble material therefrom.

12. In the process of treating vinegar with a phytate material selected from the group consisting of phytic acid and a phytate salt soluble in vinegar, the improvement which comprises adding the phytate material incrementally and removing resultant insoluble material from the vinegar.

13. The process of treating vinegar which comprises adding thereto calcium phytate at the rate of 0.1 to 1.0 g. per liter of vinegar for 25 parts p. p. m. each of iron and 35 p. p. m. of copper content, heating the vinegar to at least 160° F., and thereafter separating the resultant insoluble precipitate from the vinegar while the temperature of the vinegar is at least 160° F.

14. The process of treating vinegar which comprises adding incrementally thereto calcium phytate at the rate of 0.1 to 1.0 g. per liter of vinegar for 25 p. p. m. each of iron and 35 p. p. m. of copper content, heating the vinegar to at least 160° F. after each addition, and thereafter separating the resultant insoluble precipitate from the vinegar while the temperature of the vinegar is at least 160° F.

15. The process of treating vinegar which comprises adding thereto calcium phytate at the rate of 0.1 to 1.0 g. per liter of vinegar, heating the vinegar to about 180° F., and thereafter separating the resultant insoluble precipitate.

16. The process of treating vinegar which comprises adding incrementally thereto calcium phytate at the rate of 0.1 to 1.0 g. per liter of vinegar, heating the vinegar to at least 180° F., after each addition, and separating the resultant insoluble precipitate from the vinegar.

ROLLAND F. COHEE, Jr.

No references cited.